(12) United States Patent
Volkers et al.

(10) Patent No.: US 9,643,795 B2
(45) Date of Patent: May 9, 2017

(54) GRIPPER FOR HOLDING AN ITEM

(71) Applicant: Sluis Cigar Machinery B.V., Kampen (NL)

(72) Inventors: Jacob Volkers, Wapenveld (NL); Rombert Christiaan Beek, Zwolle (NL)

(73) Assignee: Sluis Cigar Machinery B.V., Kampen (NL)

( * ) Notice: Subject to any disclaimer, the term of this patent is extended or adjusted under 35 U.S.C. 154(b) by 0 days.

(21) Appl. No.: 14/900,773

(22) PCT Filed: Jun. 24, 2014

(86) PCT No.: PCT/NL2014/050417
§ 371 (c)(1),
(2) Date: Dec. 22, 2015

(87) PCT Pub. No.: WO2014/209116
PCT Pub. Date: Dec. 31, 2014

(65) Prior Publication Data
US 2016/0332825 A1     Nov. 17, 2016

(30) Foreign Application Priority Data

Jun. 24, 2013   (NL) ...................................... 2011031

(51) Int. Cl.
*B66C 1/42*          (2006.01)
*B65G 47/90*      (2006.01)
(Continued)

(52) U.S. Cl.
CPC .......... *B65G 47/90* (2013.01); *B25J 15/0253* (2013.01); *B25J 15/0608* (2013.01); *B65B 43/465* (2013.01)

(58) Field of Classification Search
CPC ........ B65B 43/46; B65B 43/465; B25J 15/02; B25J 15/0253; B25J 15/0608; B25J 15/026; B25J 15/00; B25J 15/0009; E21B 19/06; H01F 7/206; Y02E 60/12; B66C 1/54; B65G 47/90
See application file for complete search history.

(56) References Cited

U.S. PATENT DOCUMENTS

| 6,626,476 B1 | 9/2003 | Govzman et al. |
| 7,784,603 B2 * | 8/2010 | Burgmeier ............. B65G 47/90 198/468.5 |

(Continued)

Primary Examiner — Stephen Vu

(57) ABSTRACT

A gripper for holding an item formed from a pliable sheet material includes a body, a first contact member located a fixed position relative to the body, a second contact member which is movable into a closed position to fixate the sheet material between the first contact member and the second contact member, a first positioning member and a second positioning member located in a fixed position relative to the body. The second contact member is connected to a support movable along a trajectory to move the second contact member in the open position and in the closed position, the support including a third positioning member attached to the support to move along with the support, where the third positioning member is magnetically engaged by the first positioning member in the open position and by the second positioning member in the closed position.

20 Claims, 14 Drawing Sheets

(51) Int. Cl.
    *B65B 43/46*         (2006.01)
    *B25J 15/02*         (2006.01)
    *B25J 15/06*         (2006.01)

(56)               References Cited

U.S. PATENT DOCUMENTS 8,297,671 B2 *   10/2012   Knieling  ............... B65G 47/847
                                                                     294/198
    8,602,471 B2 *   12/2013   Bodtlander  .......... B65G 47/847
                                                                     198/803.6
    8,794,425 B2 *    8/2014   Fahldieck  ............ B65G 47/847
                                                                     198/470.1
2010/0269458 A1     10/2010   Veix
2010/0282574 A1 *   11/2010   Ueda  ................... B65G 17/323
                                                                   198/803.3

* cited by examiner

GRIPPER FOR HOLDING AN ITEM

CROSS-REFERENCE TO RELATED APPLICATIONS

This application is the National Stage of International Application No. PCT/NL2014/050417 filed Jun. 24, 2014, which claims the benefit of Netherlands Application No. NL 2011031, filed Jun. 24, 2013, the contents of which is incorporated by reference herein.

FIELD OF THE INVENTION

The invention relates to a gripper for holding an item formed from a pliable sheet material. The gripper comprises a body, a first contact member located a fixed position relative to the body, and a second contact member which is movable into an open position in which the second contact member is located at a distance from the first contact member and into a closed position to fixate the sheet material between the first contact member and the second contact member.

BACKGROUND OF THE INVENTION

A problem of the known gripper is that the second contact member sometimes by accident moves out of the open position or the closed position.

SUMMARY OF THE INVENTION

It is an object to provide an improved, or at least alternative, gripper for holding an item formed from a pliable sheet material.

The invention relates to a gripper for holding an item formed from a pliable sheet material, said gripper comprising;
  a body,
  a first contact member located in a fixed position relative to the body,
  a second contact member which is movable into an open position in which the second contact member is located at a distance from the first contact member and into a closed position to fixate the sheet material between the first contact surface and the second contact surface,
  a first positioning member and a second positioning member, which are located in a fixed position relative to the body and at a distance from each other, wherein
    the second contact member is connected to a movable support having a third positioning member, which support is movable along a trajectory to move the second contact member in the open position and in the closed position,
    the third positioning member is attached to the support to move along with the support,
    the first positioning member comprises a first magnet,
    the second positioning member comprises a second magnet,
    the third positioning member comprises magnetic material,
    in the open position, the third positioning member is magnetically engaged by the first positioning member, and
    in the closed position, the third positioning member is magnetically engaged by the second positioning member.

Magnetic material is a material which is attracted by a magnet. The magnetic material may or may not produce a magnetic field.

The forces of the magnetically engaged first positioning member and third positioning member hold the second contact member in the open position. The forces of the magnetically engaged second positioning member and third positioning member hold the second contact member in the closed position. This ensures that the second contact member does not by accident moves out of the open position or the closed position.

Furthermore, the forces of the magnetically engaged second positioning member and third positioning member ensure that in the closed position the first contact member and second contact member have an enhanced grip on the sheet material of the item.

In an alternative embodiment, the gripper comprises;
  a body,
  a first contact member located in a fixed position relative to the body,
  a second contact member which is movable into an open position in which the second contact member is located at a distance from the first contact member and into a closed position to fixate the sheet material between the first contact member and the second contact member,
  a third positioning member, which is located in a fixed position relative to the body, wherein
    the second contact member is connected to a movable support having a first positioning member and a second positioning member located at a distance from each other, which support is movable along a trajectory to move the second contact member in the open position and in the closed position,
    the first positioning member and the second positioning member are attached to the support to move along with the support,
    the first positioning member comprises a first magnet,
    the second positioning member comprises a second magnet,
    the third positioning member comprises magnetic material,
    in the open position, the third positioning member is magnetically engaged by the first positioning member, and
    in the closed position, the third positioning member is magnetically engaged by the second positioning member.

In an embodiment of the gripper according to the invention, the first magnet is configured to act against movement of the second contact member out of the open position and the second magnet is configured to act against movement of the second contact member out of the closed position.

In an embodiment of the gripper according to the invention, the first magnet is configured to support movement of the second contact member into the open position and the second magnet is configured to support movement of the second contact member into the closed position.

The invention further relates to a gripper for holding an item formed from a pliable sheet material, said gripper comprising;
  a body,
  a first contact member located in a fixed position relative to the body,
  a second contact member which is movable into an open position in which the second contact member is located at a distance from the first contact member and into a closed position to fixate the sheet material between the first contact member and the second contact member, a first positioning member and a second positioning member, which are located in a fixed position relative to the body and at a distance from each other, wherein
  the second contact member is connected to a movable support having a third positioning member, which support is movable along a trajectory to move the second contact member in the open position and in the closed position,
  the third positioning member is attached to the support to move along with the support,
  the first positioning member comprises magnetic material,
  the second positioning member comprises magnetic material,
  the third positioning member comprises a magnet,
  in the open position, the third positioning member magnetically engages the first positioning member, and
  in the closed position, the third positioning member magnetically engages the second positioning member.

In an alternative embodiment, the gripper comprises;
a body,
a first contact member located in a fixed position relative to the body,
a second contact member which is movable into an open position in which the second contact member is located at a distance from the first contact member and into a closed position to fixate the sheet material between the first contact member and the second contact member,
a third positioning member, which is located in a fixed position relative to the body, wherein
  the second contact member is connected to a movable support having a first positioning member and a second positioning member located at a distance from each other, which support is movable along a trajectory to move the second contact member in the open position and in the closed position,
  the first positioning member and the second positioning member are attached to the support to move along with the support,
  the first positioning member comprises magnetic material,
  the second positioning member comprises magnetic material,
  the third positioning member comprises a magnet,
  in the open position, the third positioning member magnetically engages the first positioning member, and
  in the closed position, the third positioning member magnetically engages the second positioning member.

In an embodiment of the gripper according to the invention, the magnet is configured to act against movement of the second contact member out of the open position and out of the closed position.

In an embodiment of the gripper according to the invention, the magnet is configured to support movement of the second contact member in the open position and in the closed position.

In an embodiment of the gripper according to the invention, the first positioning member produces a magnetic field.

In an embodiment of the gripper according to the invention, the first positioning member does not produce a magnetic field.

In an embodiment of the gripper according to the invention, the second positioning member produces a magnetic field.

In an embodiment of the gripper according to the invention, the second positioning member does not produce a magnetic field.

The invention further relates to a gripper for holding an item formed from a pliable sheet material, said gripper comprising;
a body,
a first contact member located in a fixed position relative to the body,
a second contact member which is movable into an open position in which the second contact member is located at a distance from the first contact member and into a closed position to fixate the sheet material between the first contact member and the second contact member,
a first positioning member and a second positioning member, which are located in a fixed position relative to the body and at a distance from each other, wherein
  the second contact member is connected to a movable support having a third positioning member, which support is movable along a trajectory to move the second contact member in the open position and in the closed position,
  the third positioning member is attached to the support to move along with the support,
  the first positioning member comprises a first magnet,
  the second positioning member comprises a second magnet,
  the third positioning member comprises at least one further magnet,
  in the open position, the third positioning member and the first positioning member magnetically engage each other, and
  in the closed position, the third positioning member and the second positioning member magnetically engage each other.

In an alternative embodiment, the gripper comprises;
a body,
a first contact member located in a fixed position relative to the body,
a second contact member which is movable into an open position in which the second contact member is located at a distance from the first contact member and into a closed position to fixate the sheet material between the first contact member and the second contact member,
a third positioning member, which is located in a fixed position relative to the body, wherein
  the second contact member is connected to a movable support having a first positioning member and a second positioning member located at a distance from each other, which support is movable along a trajectory to move the second contact member in the open position and in the closed position,
  the first positioning member and the second positioning member are attached to the support to move along with the support,
  the first positioning member comprises a first magnet,
  the second positioning member comprises a second magnet,
  the third positioning member comprises at least one further magnet,
  in the open position, the third positioning member and the first positioning member magnetically engage each other, and in the closed position, the third positioning member and the first positioning member magnetically engage each other.

In an embodiment of the gripper according to the invention, the first magnet and the at least one further magnet are configured to act against movement of the second contact member out of the open position and the second magnet and the at least one further magnet are configured to act against movement of the second contact member out of the closed position.

In an embodiment of the gripper according to the invention, the first magnet and the at least one further magnet are configured to support movement of the second contact member in the open position and the second magnet and the at least one further magnet are configured to support movement of the second contact member in the closed position.

In an embodiment of the gripper according to the invention, the at least one further magnet comprises a first further magnet and a second further magnet, in the open position, the first further magnet and the first magnet magnetically engage each other, in the closed position, the second further magnet and the second magnet magnetically engage each other.

In an embodiment of the gripper according to the invention, the second contact member pushes on the first contact member in the closed position. This provides a better grip of the first contact member and second contact member on the sheet material.

In an embodiment of the gripper according to the invention, at least one of the first contact member and the second contact member is resilient and compressed in the closed position.

In an embodiment of the gripper according to the invention, the first contact member and the second contact member both are resilient and compressed in the closed position.

In an embodiment of the gripper according to the invention, a drive member is attached to the support to move the support along the trajectory.

In an embodiment of the gripper according to the invention, the magnetic material is a ferromagnetic material.

In an embodiment of the gripper according to the invention, the magnetic material is an alloy having a ferromagnetic material.

In an embodiment of the gripper according to the invention, the magnetic material comprises iron.

In an embodiment of the gripper according to the invention, the magnetic material comprises nickel.

In an embodiment of the gripper according to the invention, the magnetic material comprises cobalt.

In an embodiment of the gripper according to the invention, the magnetic material comprises gadolinium.

In an embodiment of the gripper according to the invention, the magnetic material is an alloy having iron.

In an embodiment of the gripper according to the invention, the magnetic material is an alloy having nickel.

In an embodiment of the gripper according to the invention, the magnetic material is an alloy having cobalt.

In an embodiment of the gripper according to the invention, the magnetic material is an alloy having gadolinium.

In an embodiment of the gripper according to the invention, the magnetic material is an alloy having at least two of the following materials; iron, nickel, cobalt and gadolinium.

In an embodiment of the gripper according to the invention, the magnetic material is a ferrimagnetic material.

In an embodiment of the gripper according to the invention, the magnetic material is an alloy having a ferrimagnetic material. The invention further relates to a vehicle comprising a gripper according to the invention, which vehicle is configured to be moved along a rail. The invention further relates to a transport system for transporting an item formed from a pliable sheet material, which transport system comprises a rail, and at least one vehicle configured to be moved along the rail, which vehicle comprises at least one gripper according to the invention.

In an embodiment of the transport system according to the invention, the transport system comprises a first gripper and a second gripper, the first gripper is located at a distance from the second gripper when seen in the direction of the rail, the first gripper is configured to hold the sheet material of the item at a first location between its first contact member and second contact member, and the second gripper is configured to hold the sheet material of the item at a second location between its first contact member and second contact member.

In an embodiment of the transport system according to the invention, the first gripper is located on a first vehicle and the second gripper is located on a second vehicle.

In an embodiment of the transport system according to the invention, the first gripper and the second gripper are both located on one vehicle.

In an embodiment of the transport system according to the invention, the system comprises a driver configured to move the drive member of the at least one gripper in order to position the second contact member into the open position and into the closed position.

BRIEF DESCRIPTION OF THE DRAWINGS

Embodiments of the gripper, vehicle and system according to the invention will be described by way of example only, with reference to the accompanying schematic drawings in which corresponding reference symbols indicate corresponding parts, and in which:

the FIGS. 1-3 schematically show views in perspective of a first embodiment of the gripper according to the invention in the closed position, the FIGS. 4 and 5 schematically shows a view in cross section of the gripper of FIG. 1, FIG. 6 schematically shows a view in perspective of the gripper of FIG. 1 in the open position, the FIGS. 7 and 8 schematically shows a view in cross section of the gripper of FIG. 1 in the open position, the FIGS. 9-11 schematically shows a view in perspective of a transport system comprising at least one gripper of FIG. 1, FIG. 12 schematically shows a view in perspective of an alternative driver for the transport system of FIG. 9, and the FIGS. 13 and 14 schematically show a fourth embodiment of the gripper according to the invention.

DETAILED DESCRIPTION OF THE INVENTION

Figure 1:
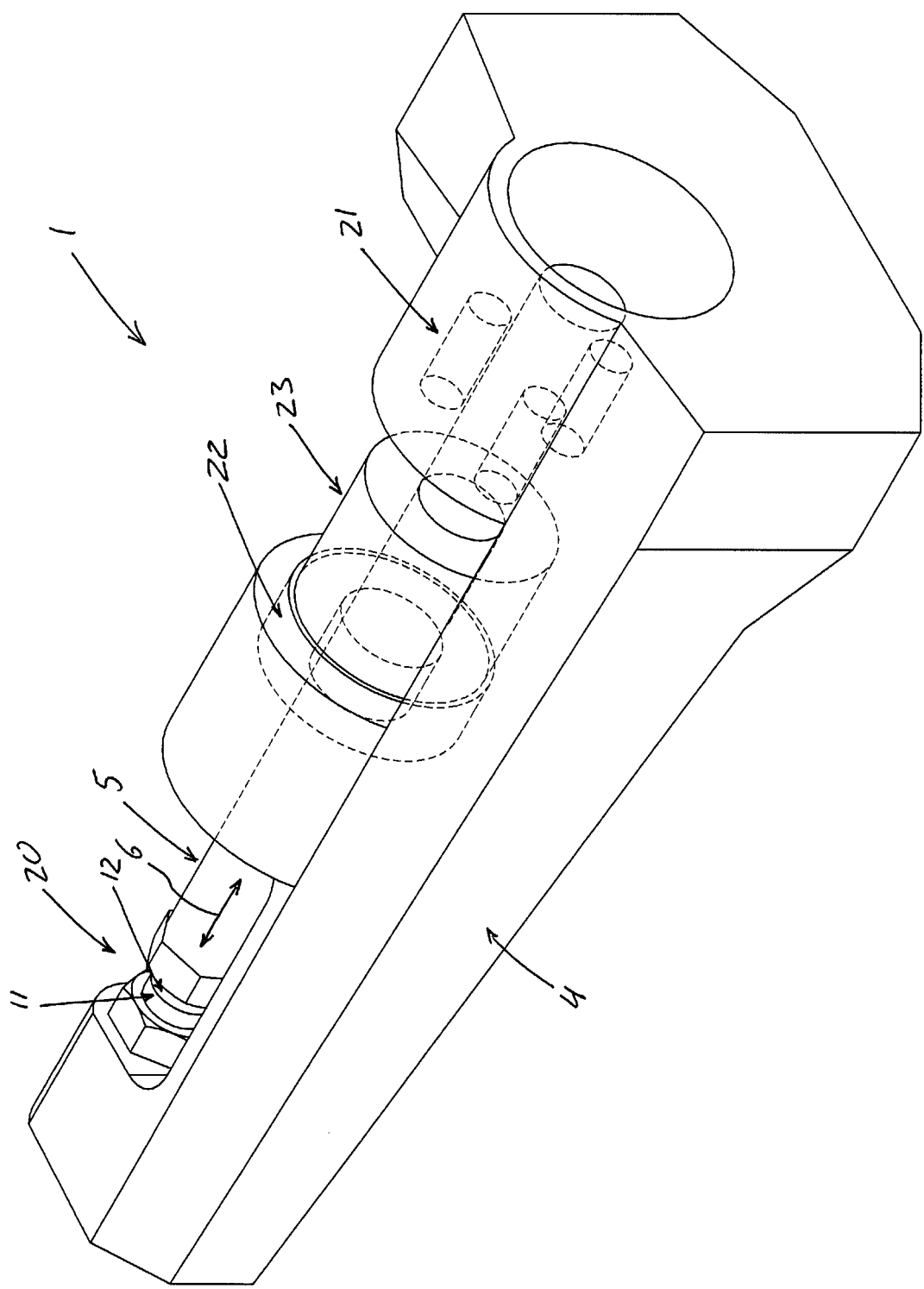
Figure 2:
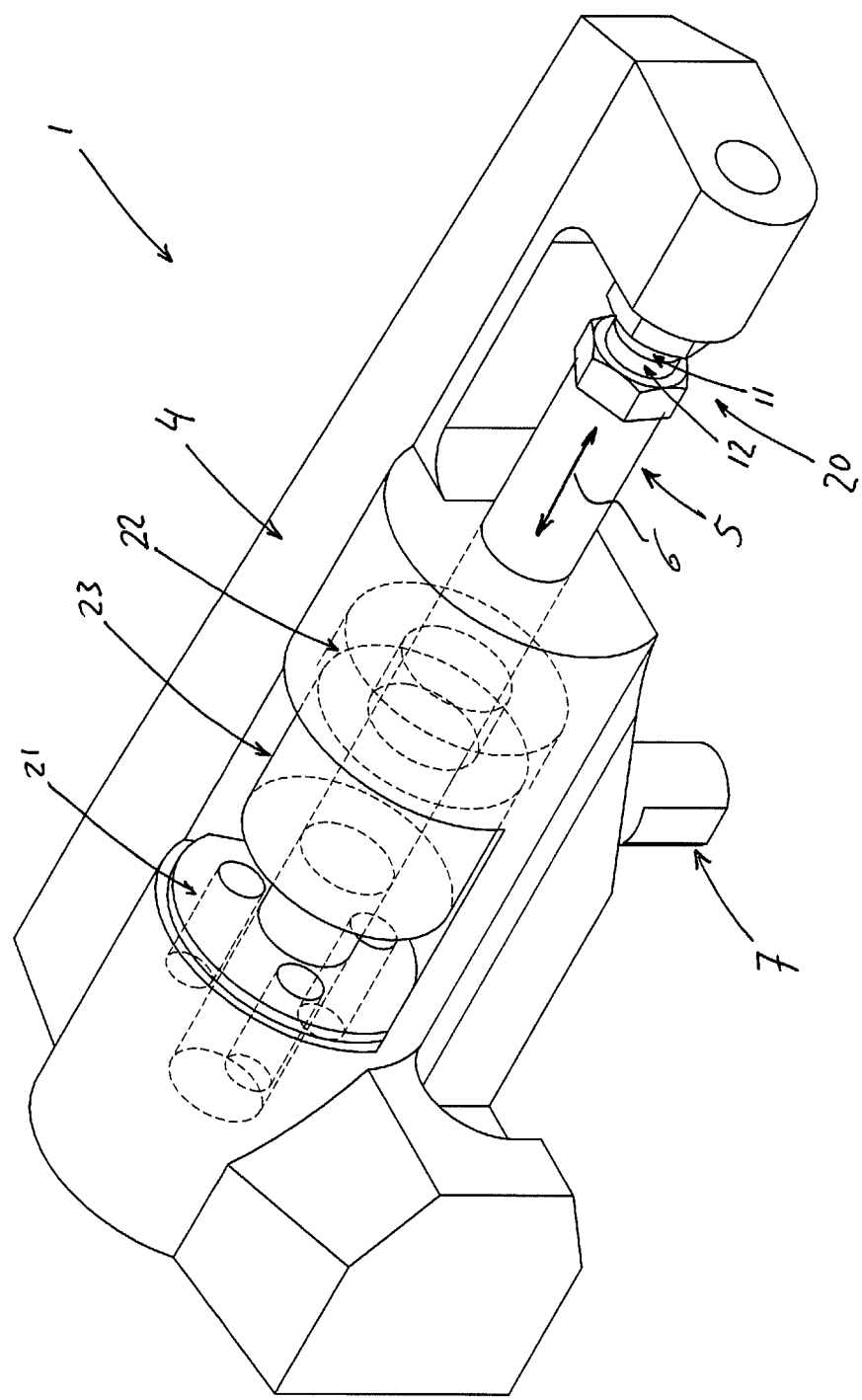
Figure 3:
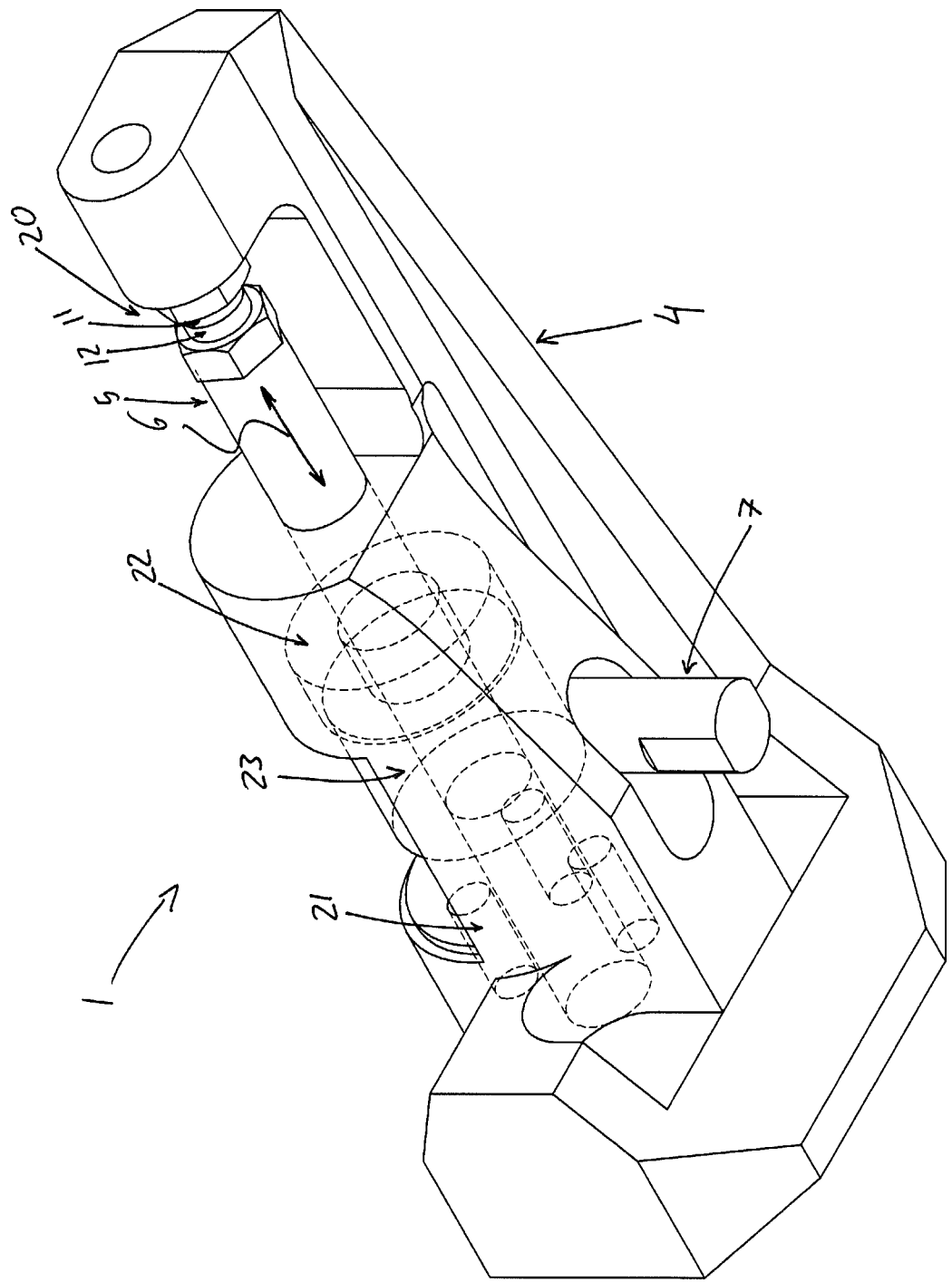
Figure 4:
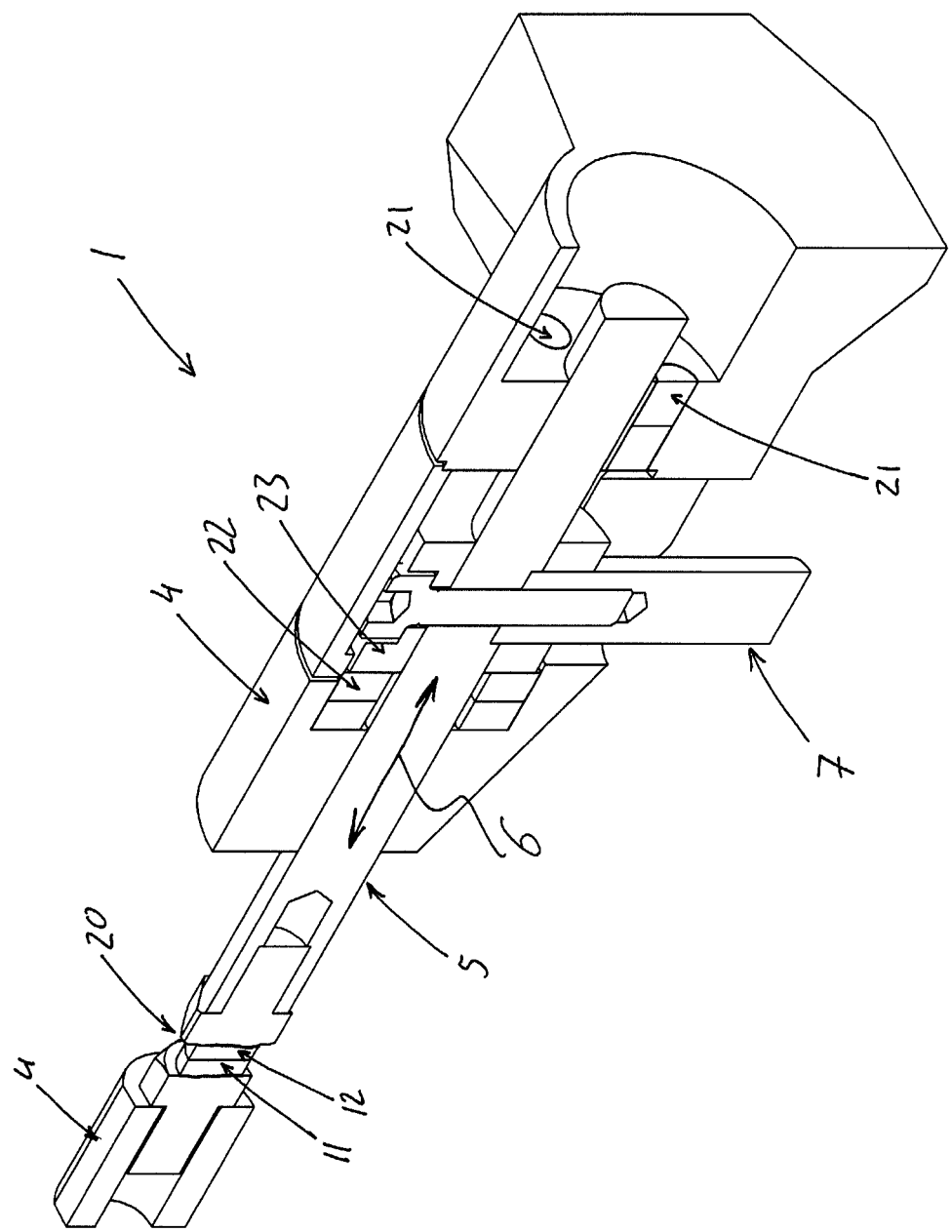
Figure 5:
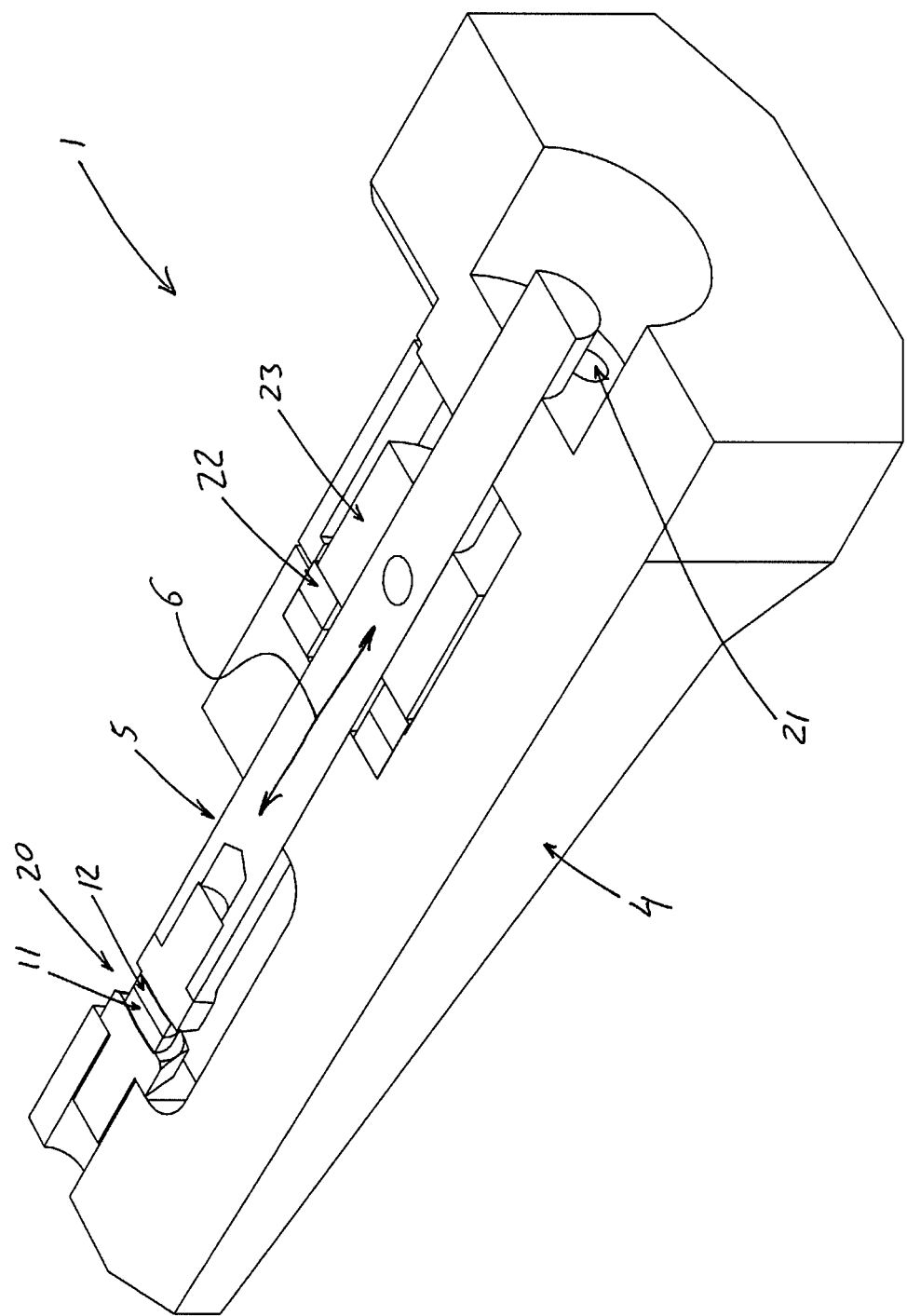

The FIGS. 1-3 show views in perspective of a first embodiment of the gripper 1 for holding an item 2 formed from a pliable sheet material 3. The FIGS. 4 and 5 show views in cross section of said gripper 1. The gripper 1 comprises a body 4, a first contact member 11 located in a fixed position relative to the body 4, and a second contact member 12 which is movable into an open position 10 in which the second contact member 12 is located at a distance from the first contact member 11 and into a closed position 20 to fixate the pliable sheet material 3 between the first contact member 11 and the second contact member 12. In FIGS. 1-3, the second contact member 12 is located in the closed position 20.

The gripper 1 further comprises a first positioning member 21 and a second positioning member 22, which are located in a fixed position relative to the body 4 and at a distance from each other.

The second contact member 12 is connected to a movable support 5 having a third positioning member 23, which support 5 is movable along a trajectory 6 to move the second contact member 12 in the open position 10 and in the closed position 20. The third positioning member 23 is attached to the support 5 to move along with the support 5.

The first positioning member 21 comprises a first magnet, the second positioning member 22 comprises a second magnet, and the third positioning member 23 comprises magnetic material. The magnetic material is iron. In alternative embodiments of the gripper 1, the magnetic material is a different ferromagnetic material, such as nickel, cobalt or gadolinium. Alloys comprising at least one of iron, nickel, cobalt, and gadolinium are also possible. In yet another embodiment of the gripper 1, the magnetic material comprises a ferromagnetic material.

In the open position 10, the third positioning member 23 is magnetically engaged by the first positioning member 21. In the closed position 20, the third positioning member 23 is magnetically engaged by the second positioning member 22.

The first magnet of the first positioning member 21 is formed by three smaller magnets of which the poles are directed in the same direction.

The first magnet acts against movement of the second contact member 12 out of the open position 10 and the second magnet acts against movement of the second contact member 12 out of the closed position 20.

The first magnet supports movement of the second contact member 12 into the open position 10 and the second magnet supports movement of the second contact member 12 into the closed position 20.

Figure 6:
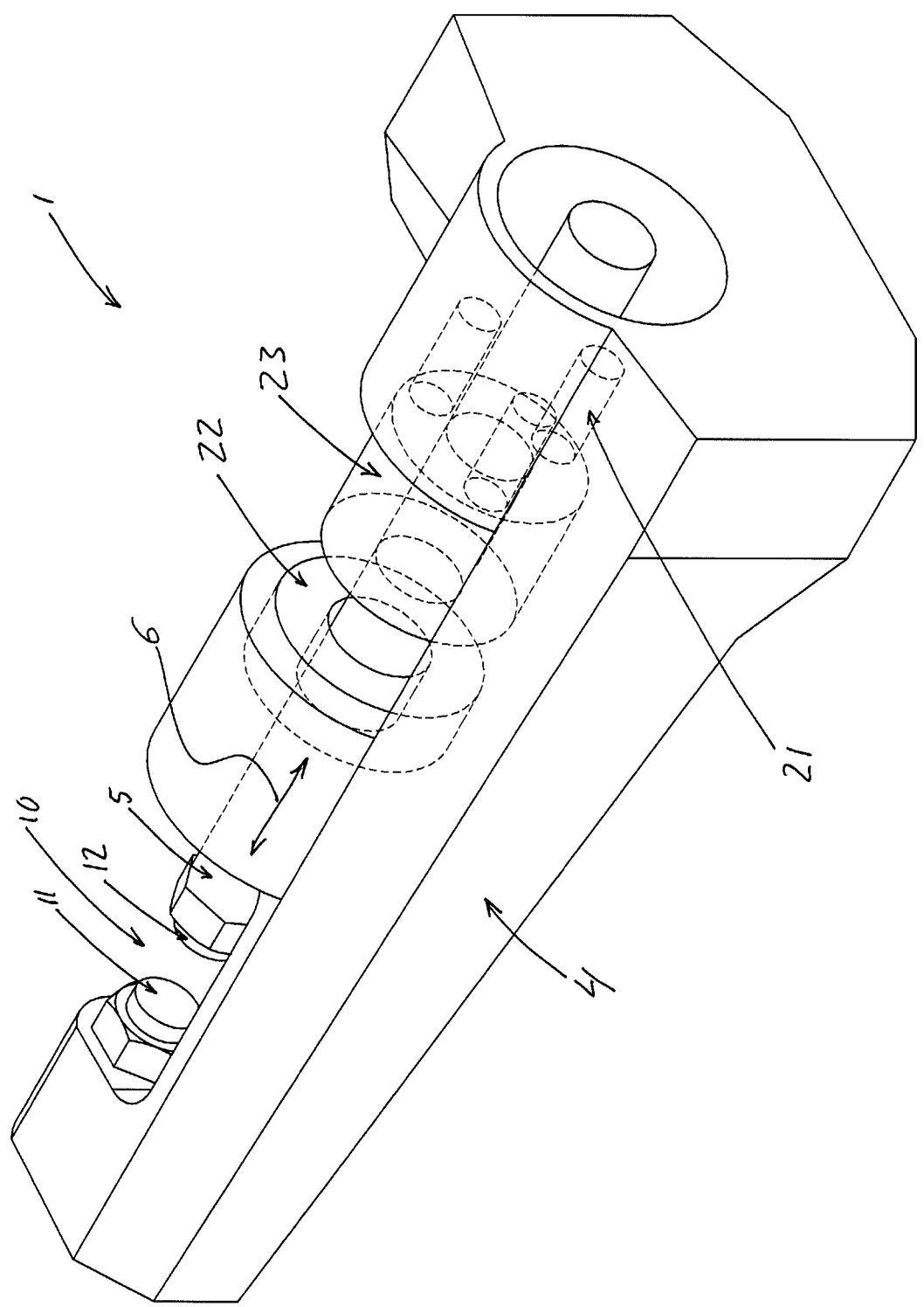
Figure 7:
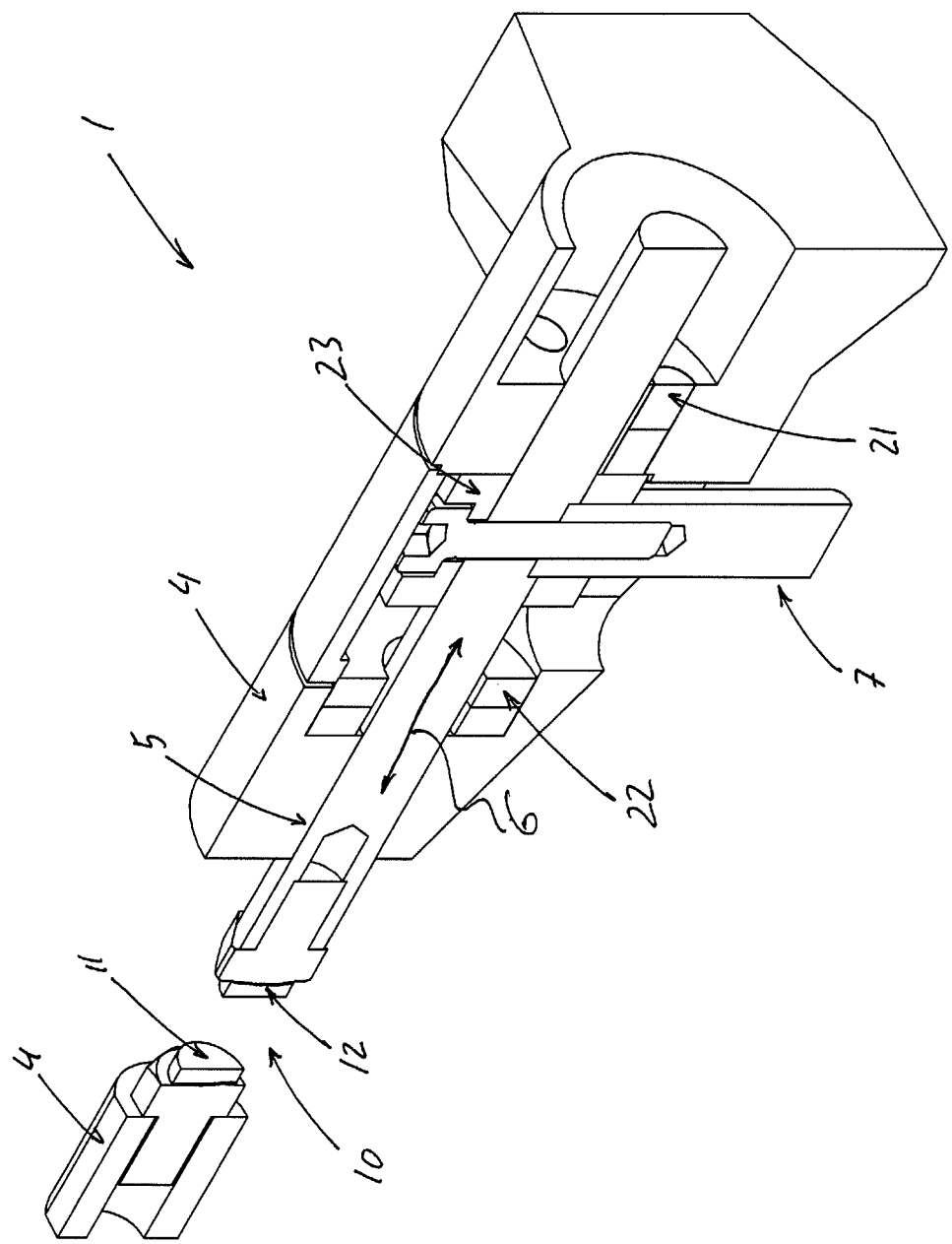
Figure 8:
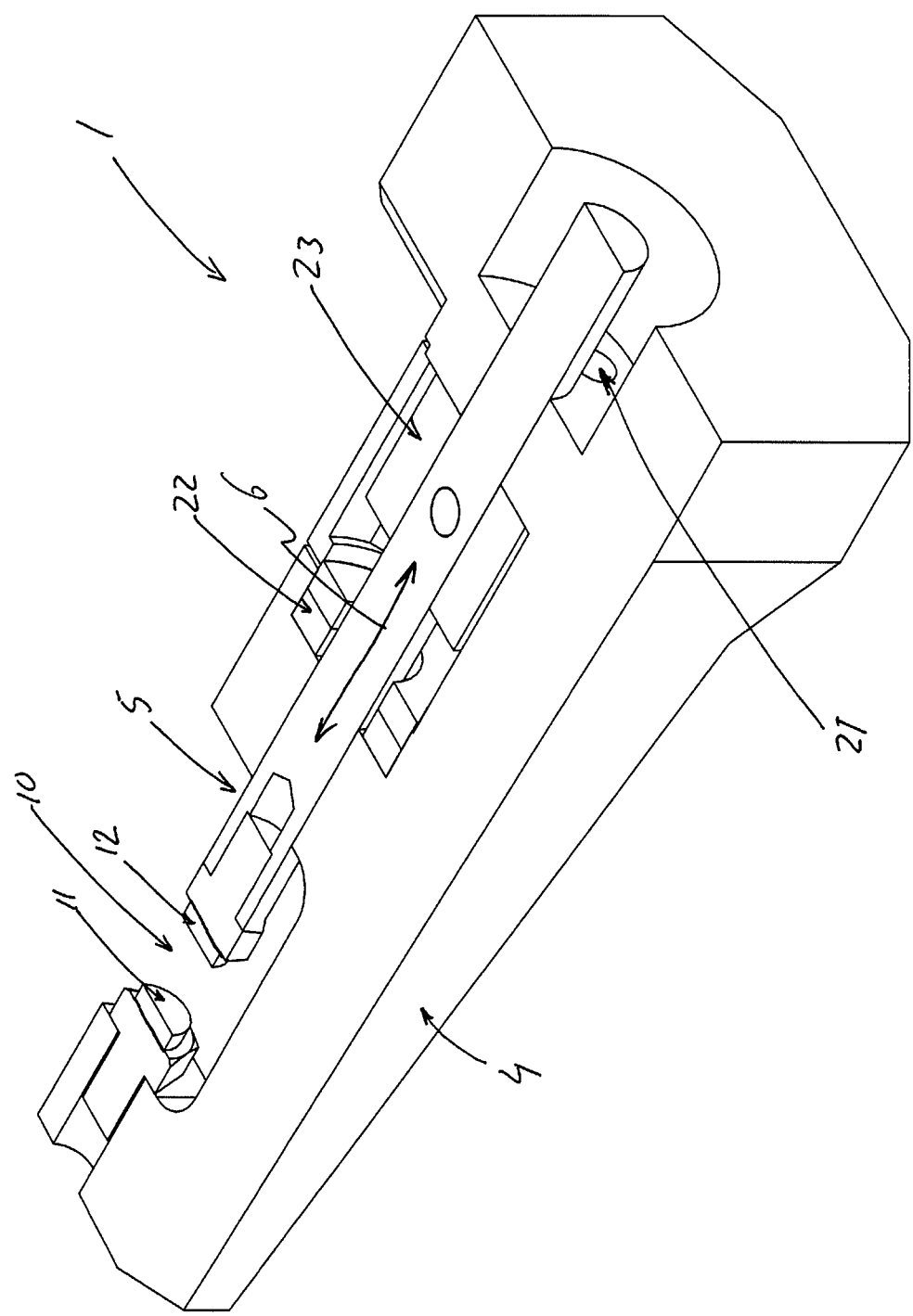

The FIGS. 1-5 show the gripper 1 with the second contact member 12 in the closed position 20. The FIGS. 6-8 show the gripper 1 with the second contact member 12 in the open position 10.

In the closed position 20, the second contact member 12 pushes on the first contact member 11. The forces produced by the magnetically engaged third positioning member 23 and second positioning member 22 are used to push the second contact member 12 on the first contact member 11 in the closed position 20. This provides a better grip of the first contact member 11 and the second contact member 12 on the sheet material 3 of the item 2.

The first contact member 11 and the second contact member 12 are both resilient and compressed in the closed position 20. The resilient first contact member 11 and second contact member 12 are compressed by the pushing force of the second contact member 12 working on the first contact member 11. This provides a better grip on the pliable sheet material 3 of the item 2. In other examples, one of the first contact member 11 and the second contact member 12 is resilient and compressed in the closed position 20.

A drive member 7 is attached to the support 5 to move the support 5 along the trajectory 6.

In a second embodiment of the gripper 1 according to the invention, the first positioning member 21 comprises magnetic material, the second positioning member 22 comprises magnetic material, and the third positioning member 23 comprises a magnet. In the open position 10, the third positioning member 23 magnetically engages the first positioning member 21. In the closed position 20, the third positioning member 23 magnetically engages the second positioning member 23.

In said second embodiment, the magnet acts against movement of the second contact member 12 out of the open position 10 and out of the closed position 20. The magnet further supports movement of the second contact member 12 in the open position 10 and in the closed position 20.

In a third embodiment of the gripper 1 according to the invention, the first positioning member 11 comprises a first magnet, the second positioning member 12 comprises a second magnet, and the third positioning member 23 comprises at least one further magnet. In the open position 10, the third positioning member 23 and the first positioning member 21 magnetically engage each other. In the closed position 20, the third positioning member 23 and the second positioning member 22 magnetically engage each other.

In said third embodiment, the first magnet and the at least one further magnet act against movement of the second contact member 12 out of the open position 10 and the second magnet and the at least one further magnet act against movement of the second contact member 12 out of the closed position 20. In addition, the first magnet and the at least one further magnet support movement of the second contact member 12 in the open position 10 and the second magnet and the at least one further magnet support movement of the second contact member 12 in the closed position 20.

Figure 9:
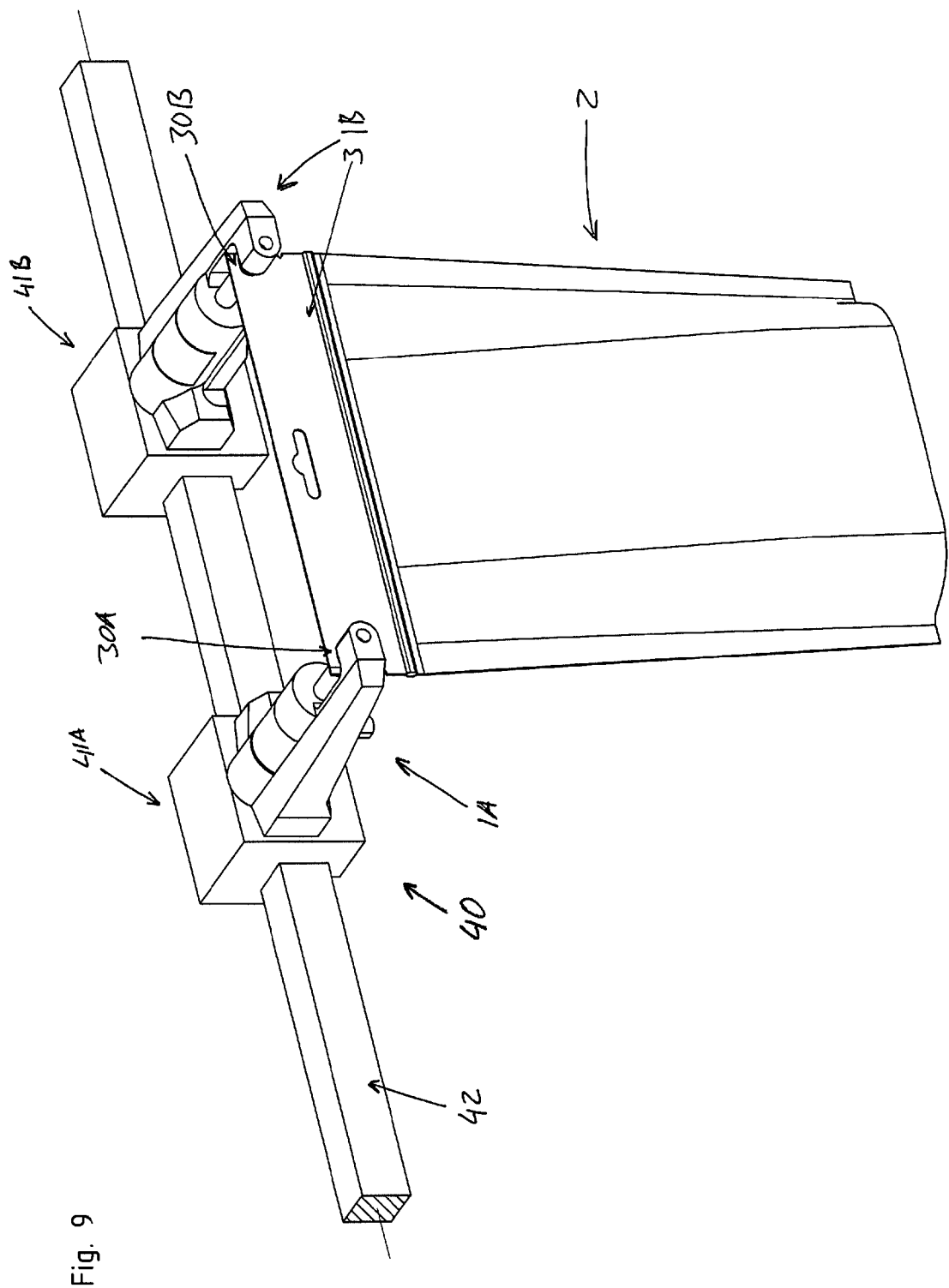
Figure 10:
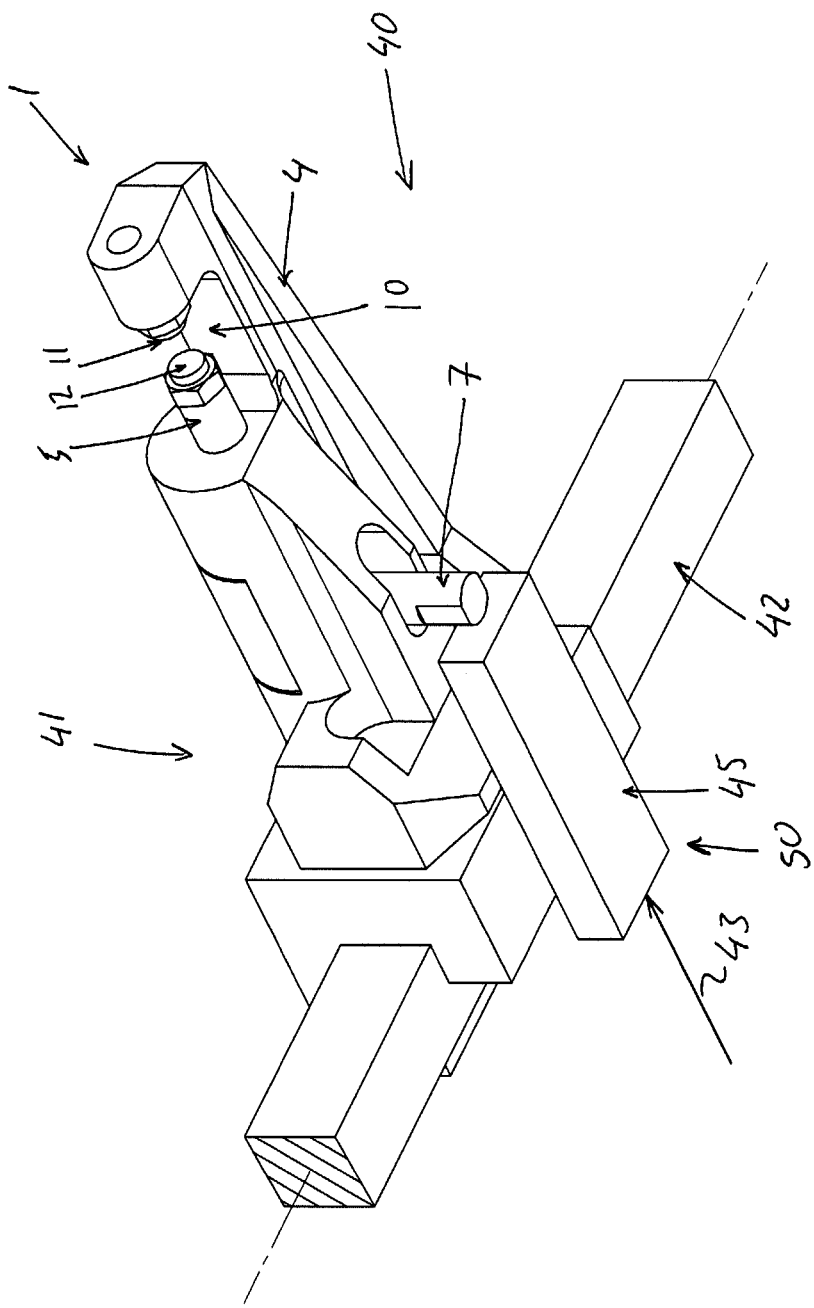
Figure 11:
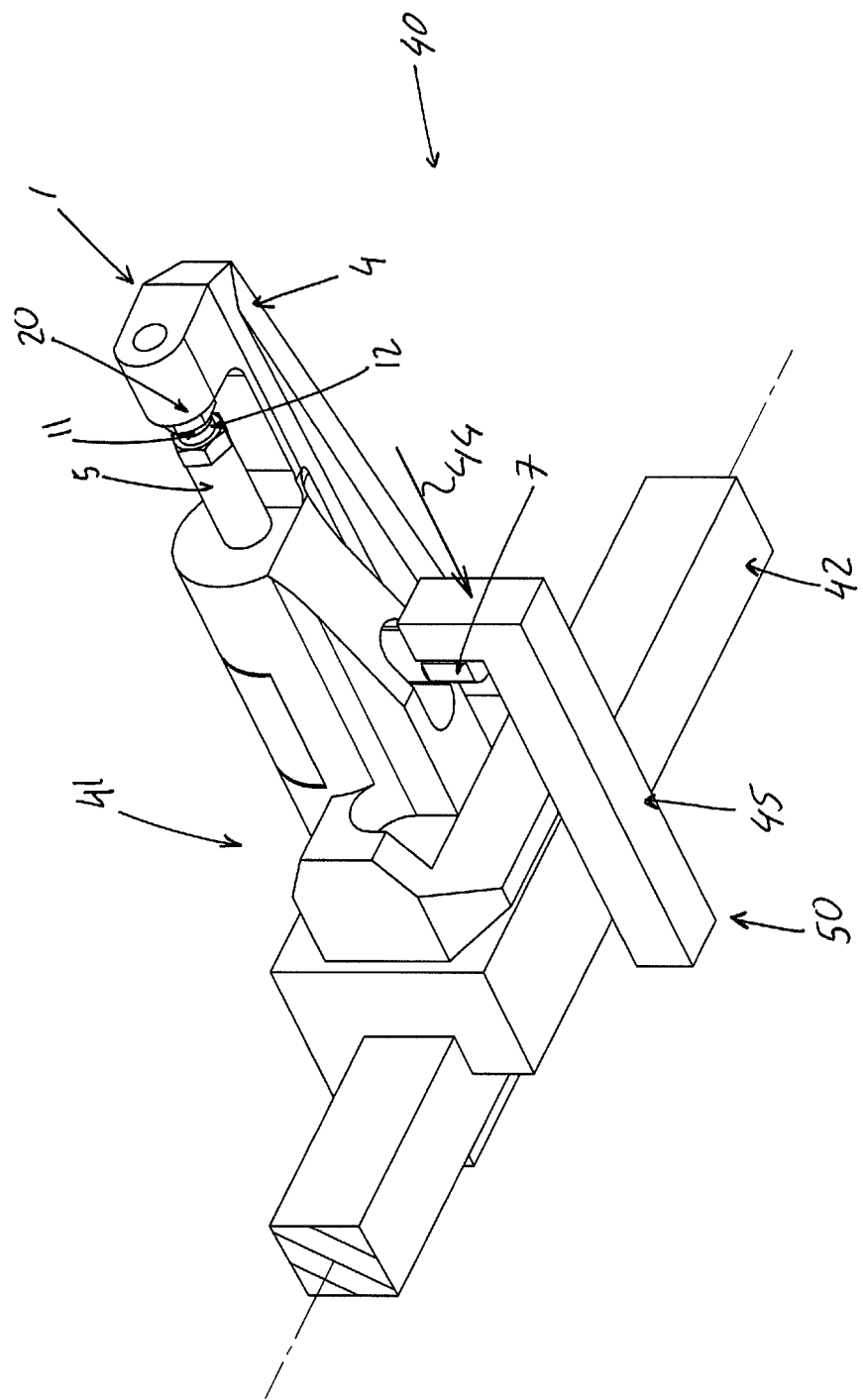

The FIGS. 9-11 show views in perspective of a transport system 40 for transporting an item 2 formed from a pliable sheet material 3. The transport system 40 comprises a rail 42, and a first vehicle 41A and a second vehicle 41B both configured to be moved along the rail 42. The first vehicle 41A comprises a first gripper 1A and the second vehicle 41B comprises a second gripper 1B. In other examples, multiple grippers 1 are provided on one vehicle 41.

The first gripper 1A is located at a distance from the second gripper 1B when seen in the direction of the rail 42. The first gripper 1A is configured to hold the pliable sheet material 3 of the item 2 at a first location 30A between its first contact member 11 and second contact member 12. The second gripper 1B is configured to hold the sheet material 3 of the item 2 at a second location 30B between its first contact member 11 and second contact member 12.

The system 40 comprises a driver 50 configured to move the drive member 7 of the at least one gripper 1 in order to position the second contact member 12 into the open position 10 and into the closed position 20. The driver 50 comprises arms 45 positioned at specific locations along the rail 42. A first type of arm 45 is shown in FIG. 10. Said arm 45 is moved electronically in the direction of arrow 43 to move the second contact member 12 from the open position 10 into the closed position 20. A second type of arm 45 is shown in FIG. 11. Said arm 45 is moved electronically in the direction of arrow 44 to move the second contact member 12 from the closed position 20 into the open position 10. In other examples, the arms 45 are driven in a different manner, such as hydraulically or pneumatically.

Figure 12:
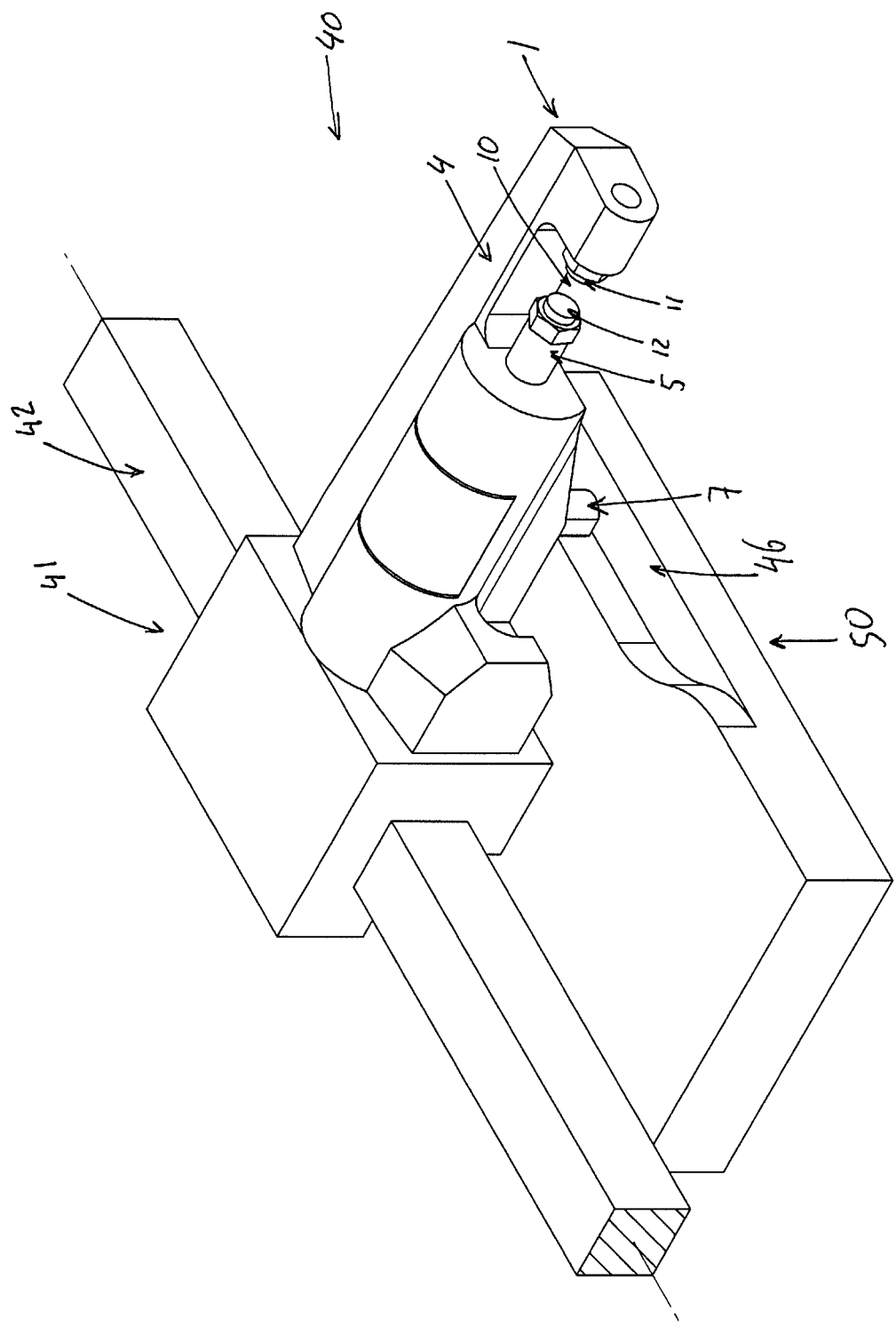

FIG. 12 schematically shows a view in perspective of an alternative driver 50 for the transport system of FIG. 9. Only part of the driver 50 is shown. The driver 50 comprises a cam track 46 which is configured to drive the drive member 7 in order to move the second contact member 12 from the closed position 20 into the open position 10, and from the open position 10 into the closed position 20, when the gripper 1 is moved along the cam track 46. The shown part of the cam track 46 is configured to move the second contact member 12 from the open position 10 into the closed position 20. The can track 46 also has a part which is configured to move the second contact member 12 from the closed position 20 into the open position 10.

Figure 13:
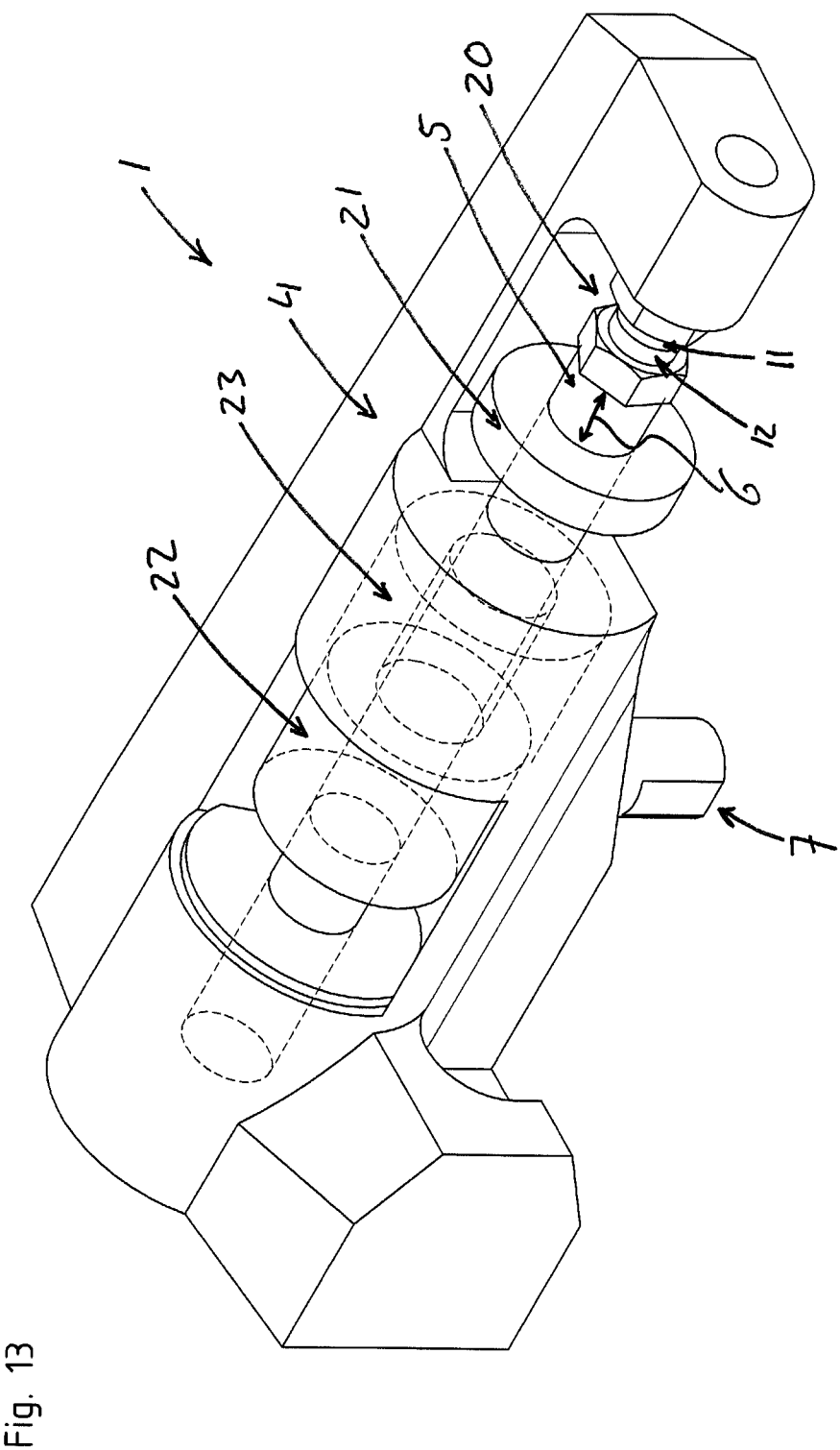
Figure 14:
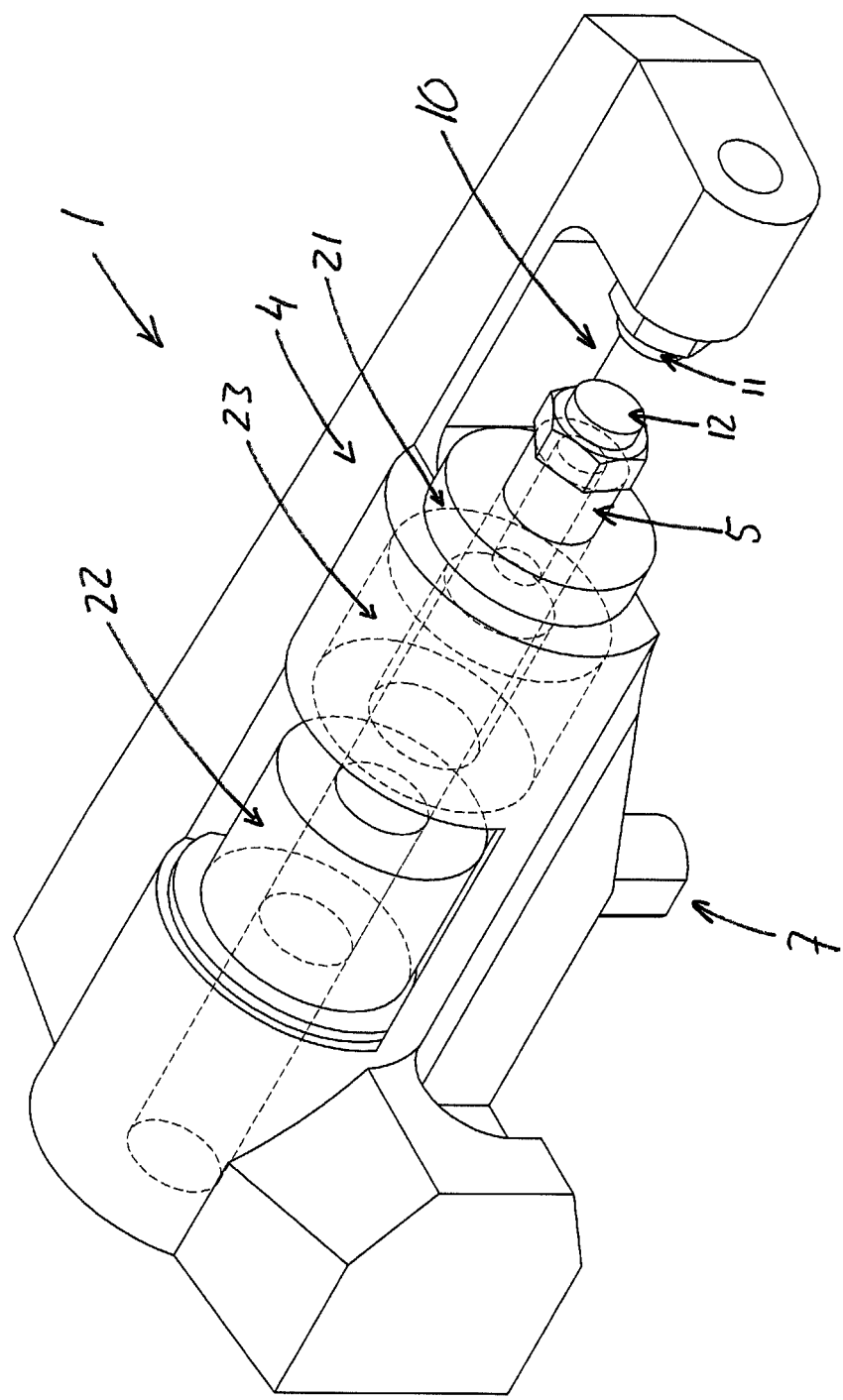

The FIGS. 13 and 14 show a fourth embodiment of the gripper according to the invention. The gripper 1 comprises a body 4, a first contact member 11 located in a fixed position relative to the body 4, and a second contact member 12 which is movable into an open position 10 in which the second contact member 12 is located at a distance from the first contact member 11 and into a closed position 20 to fixate the sheet material between the first contact member 11 and the second contact member 12, The gripper 1 further comprises a third positioning member 23, which is located in a fixed position relative to the body 4. The second contact member 12 is connected to a movable support 5 having a first positioning member 21 and a second positioning member 22 located at a distance from each other, which support 5 is movable along a trajectory 6 to move the second contact member 12 in the open position 10 and in the closed position 20. The first positioning member 21 and the second positioning member 22 are attached to the support 5 to move along with the support 5. The first positioning member 21 comprises a first magnet. The second positioning member 22 comprises a second magnet. The third positioning member 23 comprises magnetic material. In the open position 10, the third positioning member 23 is magnetically engaged by the first positioning member 21 (see FIG. 14). In the closed position 20, the third positioning member 23 is magnetically engaged by the second positioning member 22 (see FIG. 13).

In a fifth embodiment of the gripper according to the invention, the first positioning member 21 comprises magnetic material, the second positioning member 22 comprises magnetic material, and the third positioning member 23 comprises a magnet. In the open position 10, the third positioning member 23 magnetically engages the first positioning member 21, and in the closed position 20, the third positioning member 23 magnetically engages the second positioning member 22.

In a sixth embodiment of the gripper according to the invention, the first positioning member 21 comprises a first magnet, the second positioning member 22 comprises a second magnet, the third positioning member 23 comprises at least one further magnet. In the open position 10, the third positioning member 23 and the first positioning member 21 magnetically engage each other, and in the closed position 20, the third positioning member 23 and the first positioning member 21 magnetically engage each other.

The following clauses offer a further description of the gripper and the transport system according to the invention.

1. Gripper (1) for holding an item (2) formed from a pliable sheet material (3), said gripper comprising;
   a body (4),
   a first contact member (11) located in a fixed position relative to the body,
   a second contact member (12) which is movable into an open position (10) in which the second contact member is located at a distance from the first contact member and into a closed position (20) to fixate the sheet material between the first contact member and the second contact member,
   a first positioning member (21) and a second positioning member (22), which are located in a fixed position relative to the body and at a distance from each other, wherein
   the second contact member is connected to a movable support (5) having a third positioning member (23), which support is movable along a trajectory (6) to move the second contact member in the open position and in the closed position,
   the third positioning member is attached to the support to move along with the support,
   the first positioning member comprises a first magnet,
   the second positioning member comprises a second magnet,
   the third positioning member comprises magnetic material,
   in the open position, the third positioning member is magnetically engaged by the first positioning member, and
   in the closed position, the third positioning member is magnetically engaged by the second positioning member.

2. Gripper (1) for holding an item (2) formed from a pliable sheet material (3), said gripper comprising;
   a body (4),
   a first contact member (11) located in a fixed position relative to the body,
   a second contact member (12) which is movable into an open position (10) in which the second contact member is located at a distance from the first contact member and into a closed position (20) to fixate the sheet material between the first contact member and the second contact member,
   a third positioning member (23), which is located in a fixed position relative to the body, wherein
   the second contact member is connected to a movable support (5) having a first positioning member (21) and a second positioning member (22) located at a distance from each other, which support is movable along a trajectory (6) to move the second contact member in the open position and in the closed position,
   the first positioning member and the second positioning member are attached to the support to move along with the support,
   the first positioning member comprises a first magnet,
   the second positioning member comprises a second magnet,
   the third positioning member comprises magnetic material,
   in the open position, the third positioning member is magnetically engaged by the first positioning member, and
   in the closed position, the third positioning member is magnetically engaged by the second positioning member.

3. Gripper according to clause 1 or 2, wherein the first magnet is configured to act against movement of the second contact member out of the open position and the second magnet is configured to act against movement of the second contact member out of the closed position.

4. Gripper according to any of the preceding clauses, wherein the first magnet is configured to support movement of the second contact member into the open position and the second magnet is configured to support movement of the second contact member into the closed position.

5. Gripper for holding an item formed from a pliable sheet material, said gripper comprising;
   a body,
   a first contact member located in a fixed position relative to the body, a second contact member which is movable into an open position in which the second contact member is located at a distance from the first contact member and into a closed position to fixate the sheet material between the first contact member and the second contact member, a first positioning member and a second positioning member, which are located in a fixed position relative to the body and at a distance from each other, wherein the second contact member is connected to a movable support having a third positioning member, which support is movable along a trajectory to move the second contact member in the open position and in the closed position, the third positioning member is attached to the support to move along with the support, the first positioning member comprises magnetic material, the second positioning member comprises magnetic material, the third positioning member comprises a magnet, in the open position, the third positioning member magnetically engages the first positioning member, and in the closed position, the third positioning member magnetically engages the second positioning member.

6. Gripper (1) for holding an item (2) formed from a pliable sheet material (3), said gripper comprising;

a body (4), a first contact member (11) located in a fixed position relative to the body, a second contact member (12) which is movable into an open position (10) in which the second contact member is located at a distance from the first contact member and into a closed position (20) to fixate the sheet material between the first contact member and the second contact member, a third positioning member (23), which is located in a fixed position relative to the body, wherein the second contact member is connected to a movable support (5) having a first positioning member (21) and a second positioning member (22) located at a distance from each other, which support is movable along a trajectory (6) to move the second contact member in the open position and in the closed position, the first positioning member and the second positioning member are attached to the support to move along with the support, the first positioning member comprises magnetic material, the second positioning member comprises magnetic material, the third positioning member comprises a magnet, in the open position, the third positioning member magnetically engages the first positioning member, and in the closed position, the third positioning member magnetically engages the second positioning member.

7. Gripper according to clause 5 or 6, wherein the magnet is configured to act against movement of the second contact member out of the open position and out of the closed position.

8. Gripper according to any of the clauses 5-7, wherein the magnet is configured to support movement of the second contact member in the open position and in the closed position.

9. Gripper for holding an item formed from a pliable sheet material, said gripper comprising;

a body, a first contact member located in a fixed position relative to the body, a second contact member which is movable into an open position in which the second contact member is located at a distance from the first contact member and into a closed position to fixate the sheet material between the first contact member and the second contact member, a first positioning member and a second positioning member, which are located in a fixed position relative to the body and at a distance from each other, wherein the second contact member is connected to a movable support having a third positioning member, which support is movable along a trajectory to move the second contact member in the open position and in the closed position, the third positioning member is attached to the support to move along with the support, the first positioning member comprises a first magnet, the second positioning member comprises a second magnet, the third positioning member comprises at least one further magnet, in the open position, the third positioning member and the first positioning member magnetically engage each other, and in the closed position, the third positioning member and the second positioning member magnetically engage each other.

10. Gripper (1) for holding an item (2) formed from a pliable sheet material (3), said gripper comprising;

a body (4), a first contact member (11) located in a fixed position relative to the body, a second contact member (12) which is movable into an open position (10) in which the second contact member is located at a distance from the first contact member and into a closed position (20) to fixate the sheet material between the first contact member and the second contact member, a third positioning member (23), which is located in a fixed position relative to the body, wherein the second contact member is connected to a movable support (5) having a first positioning member (21) and a second positioning member (22) located at a distance from each other, which support is movable along a trajectory (6) to move the second contact member in the open position and in the closed position, the first positioning member and the second positioning member are attached to the support to move along with the support, the first positioning member comprises a first magnet, the second positioning member comprises a second magnet, the third positioning member comprises at least one further magnet, in the open position, the third positioning member and the first positioning member magnetically engage each other, and in the closed position, the third positioning member and the first positioning member magnetically engage each other.

11. Gripper according to clause 9 or 10, wherein the first magnet and the at least one further magnet are configured to act against movement of the second contact member out of the open position and the second magnet and the at least one further magnet act against movement of the second contact member out of the closed position.

12. Gripper according to any of the clauses 9-10, wherein the first magnet and the at least one further magnet are configured to support movement of the second contact member in the open position and the second magnet and the at least one further magnet support movement of the second contact member in the closed position.

13. Gripper according to any of the clauses 9-12, wherein
the at least one further magnet comprises a first further magnet and a second further magnet,
in the open position, the first further magnet and the first magnet magnetically engage each other,
in the closed position, the second further magnet and the second magnet magnetically engage each other.

14. Gripper according to any of the preceding clauses, wherein in the closed position, the second contact member pushes on the first contact member.

15. Gripper according to any of the preceding clauses, wherein at least one of the first contact member and the second contact member is resilient and compressed in the closed position.

16. Gripper according to any of the clauses 1-14, wherein the first contact member and the second contact member both are resilient and compressed in the closed position.

17. Gripper according to any of the preceding clauses, wherein a drive member is attached to the movable support to move the support along the trajectory.

18. Gripper according to any of the preceding clauses, wherein the magnetic material is a ferromagnetic material.

19. Gripper according to any of the preceding clauses, wherein the magnetic material comprises iron or nickel or cobalt or gadolinium.

20. Gripper according to any of the clauses 1-17, wherein the magnetic material is a ferrimagnetic material.

21. Gripper according to any of the preceding clauses, wherein the magnetic material produces a magnetic field.

22. Gripper according to any of the clauses 1-20, wherein the magnetic material does not produce a magnetic field.

23. Gripper according to any of the clauses 7, 8, 14-20 and in combination with clause 5 or 6, wherein the first positioning member produces a magnetic field.

24. Gripper according to any of the clauses 7, 8, 14-20 and in combination with clause 5 or 6, wherein the first positioning member does not produce a magnetic field.

25. Gripper according to any of the clauses 7, 8, 14-20, 23, 24 and in combination with clause 5 or 6, wherein the second positioning member produces a magnetic field.

26. Gripper according to any of the clauses 7, 8, 14-20, 23, 24 and in combination with clause 5 or 6, wherein the second positioning member does not produce a magnetic field.

27. Vehicle comprising a gripper according to any of the preceding clauses, which vehicle is configured to be moved along a rail.

28. Transport system for transporting an item formed from a pliable sheet material, which transport system comprises;
a rail, and
at least one vehicle configured to be moved along the rail, which vehicle comprises at least one gripper according to any of the preceding clauses.

29. Transport system according to clause 28, wherein;
the transport system comprises a first gripper and a second gripper,
the first gripper is located at a distance from the second gripper when seen in the direction of the rail,
the first gripper is configured to hold the sheet material of the item at a first location between its first contact member and second contact member, and
the second gripper is configured to hold the sheet material of the item at a second location between its first contact member and second contact member.

30. Transport system according to clause 28 or 29, wherein the first gripper is located on a first vehicle and the second gripper is located on a second vehicle.

31. Transport system according to clause 28 or 29, wherein the first gripper and the second gripper are both located on one vehicle.

32. Transport system according to any of the clauses 28-31, wherein the system comprises a driver configured to move the drive member of the at least one gripper in order to position the second contact member into the open position and into the closed position.

It will be apparent to those skilled in the art that various modifications can be made to the gripper 1, vehicle 41, and system 40 without departing from the scope as defined in the claims.

The invention claimed is:

1. A gripper for holding an item formed from a pliable sheet material, said gripper comprising:
   a body,
   a first contact member located in a fixed position relative to the body,
   a second contact member which is movable into an open position in which the second contact member is located at a distance from the first contact member and into a closed position to fixate the sheet material between the first contact member and the second contact member, and
   a first positioning member and a second positioning member, which are located in a fixed position relative to the body and at a distance from each other,
   wherein:
   the second contact member is connected to a movable support having a third positioning member, which support is movable along a trajectory to move the second contact member in the open position and in the closed position,
   the third positioning member is attached to the support to move along with the support,
   the first positioning member comprises a first magnet,
   the second positioning member comprises a second magnet,
   the third positioning member comprises magnetic material,
   in the open position, the third positioning member is magnetically engaged by the first positioning member, and
   in the closed position, the third positioning member is magnetically engaged by the second positioning member.

2. The gripper according to claim 1, wherein the first magnet is configured to act against movement of the second contact member out of the open position and the second magnet is configured to act against movement of the second contact member out of the closed position.

3. The gripper claim 1, wherein the first magnet is configured to support movement of the second contact member into the open position and the second magnet is configured to support movement of the second contact member into the closed position.

4. A transport system for transporting an item formed from a pliable sheet material, which transport system comprises:
   a rail, and
   at least one vehicle configured to be moved along the rail, which vehicle comprises at least one gripper according to claim 1.

5. A gripper for holding an item formed from a pliable sheet material, said gripper comprising:
   a body,
   a first contact member located in a fixed position relative to the body,
   a second contact member which is movable into an open position in which the second contact member is located at a distance from the first contact member and into a closed position to fixate the sheet material between the first contact member and the second contact member, and
   a third positioning member, which is located in a fixed position relative to the body,
   wherein:
      the second contact member is connected to a movable support having a first positioning member and a second positioning member located at a distance from each other, which support is movable along a trajectory to move the second contact member in the open position and in the closed position,
      the first positioning member and the second positioning member are attached to the support to move along with the support,
      the first positioning member comprises a first magnet,
      the second positioning member comprises a second magnet,
      the third positioning member comprises magnetic material,
      in the open position, the third positioning member is magnetically engaged by the first positioning member, and
      in the closed position, the third positioning member is magnetically engaged by the second positioning member.

6. The gripper according to claim 5, wherein the first magnet is configured to act against movement of the second contact member out of the open position and the second magnet is configured to act against movement of the second contact member out of the closed position.

7. The gripper claim 5, wherein the first magnet is configured to support movement of the second contact member into the open position and the second magnet is configured to support movement of the second contact member into the closed position.

8. A transport system for transporting an item formed from a pliable sheet material, which transport system comprises:
   a rail, and
   at least one vehicle configured to be moved along the rail, which vehicle comprises at least one gripper according to claim 5.

9. A gripper for holding an item formed from a pliable sheet material, said gripper comprising:
   a body,
   a first contact member located in a fixed position relative to the body,
   a second contact member which is movable into an open position in which the second contact member is located at a distance from the first contact member and into a closed position to fixate the sheet material between the first contact member and the second contact member, and
   a first positioning member and a second positioning member, which are located in a fixed position relative to the body and at a distance from each other,
   wherein:
      the second contact member is connected to a movable support having a third positioning member, which support is movable along a trajectory to move the second contact member in the open position and in the closed position,
      the third positioning member is attached to the support to move along with the support,
      the first positioning member comprises magnetic material,
      the second positioning member comprises magnetic material,
      the third positioning member comprises a magnet,
      in the open position, the third positioning member magnetically engages the first positioning member, and
      in the closed position, the third positioning member magnetically engages the second positioning member.

10. The gripper according to claim 9, wherein the magnet is configured to act against movement of the second contact member out of the open position and out of the closed position.

11. The gripper according to claim 9, wherein the magnet is configured to support movement of the second contact member in the open position and in the closed position.

12. A transport system for transporting an item formed from a pliable sheet material, which transport system comprises:
   a rail, and
   at least one vehicle configured to be moved along the rail, which vehicle comprises at least one gripper according to claim 9.

13. A gripper for holding an item formed from a pliable sheet material, said gripper comprising:
   a body,
   a first contact member located in a fixed position relative to the body,
   a second contact member which is movable into an open position in which the second contact member is located at a distance from the first contact member and into a closed position to fixate the sheet material between the first contact member and the second contact member, and
   a third positioning member, which is located in a fixed position relative to the body,
   wherein:
      the second contact member is connected to a movable support having a first positioning member and a second positioning member located at a distance from each other, which support is movable along a trajectory to move the second contact member in the open position and in the closed position, the first positioning member and the second positioning member are attached to the support to move along with the support, the first positioning member comprises magnetic material, the second positioning member comprises magnetic material, the third positioning member comprises a magnet, in the open position, the third positioning member magnetically engages the first positioning member, and in the closed position, the third positioning member magnetically engages the second positioning member.

14. The gripper according to claim 13, wherein the magnet is configured to act against movement of the second contact member out of the open position and out of the closed position.

15. The gripper according to claim 13, wherein the magnet is configured to support movement of the second contact member in the open position and in the closed position.

16. A transport system for transporting an item formed from a pliable sheet material, which transport system comprises:

a rail, and at least one vehicle configured to be moved along the rail, which vehicle comprises at least one gripper according to claim 13.

17. A gripper for holding an item formed from a pliable sheet material, said gripper comprising:

a body, a first contact member located in a fixed position relative to the body, a second contact member which is movable into an open position in which the second contact member is located at a distance from the first contact member and into a closed position to fixate the sheet material between the first contact member and the second contact member, and a first positioning member and a second positioning member, which are located in a fixed position relative to the body and at a distance from each other, wherein:

the second contact member is connected to a movable support having a third positioning member, which support is movable along a trajectory to move the second contact member in the open position and in the closed position, the third positioning member is attached to the support to move along with the support, the first positioning member comprises a first magnet, the second positioning member comprises a second magnet, the third positioning member comprises at least one further magnet, in the open position, the third positioning member and the first positioning member magnetically engage each other, and in the closed position, the third positioning member and the second positioning member magnetically engage each other.

18. A transport system for transporting an item formed from a pliable sheet material, which transport system comprises:

a rail, and at least one vehicle configured to be moved along the rail, which vehicle comprises at least one gripper according to claim 17.

19. A gripper for holding an item formed from a pliable sheet material, said gripper comprising:

a body, a first contact member located in a fixed position relative to the body, a second contact member which is movable into an open position in which the second contact member is located at a distance from the first contact member and into a closed position to fixate the sheet material between the first contact member and the second contact member, a third positioning member, which is located in a fixed position relative to the body, wherein:

the second contact member is connected to a movable support having a first positioning member and a second positioning member located at a distance from each other, which support is movable along a trajectory to move the second contact member in the open position and in the closed position, the first positioning member and the second positioning member are attached to the support to move along with the support, the first positioning member comprises a first magnet, the second positioning member comprises a second magnet, the third positioning member comprises at least one further magnet, in the open position, the third positioning member and the first positioning member magnetically engage each other, and in the closed position, the third positioning member and the first positioning member magnetically engage each other.

20. A transport system for transporting an item formed from a pliable sheet material, which transport system comprises:

a rail, and at least one vehicle configured to be moved along the rail, which vehicle comprises at least one gripper according to claim 19.

* * * * *